United States Patent
Kwon et al.

(10) Patent No.: US 9,225,957 B2
(45) Date of Patent: Dec. 29, 2015

(54) MOBILE TERMINAL AND CONTROLLING METHOD THEREOF

(71) Applicant: LG ELECTRONICS INC., Seoul (KR)

(72) Inventors: Yunmi Kwon, Seoul (KR); Minkyoung Chang, Seoul (KR); Arim Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/889,639

(22) Filed: May 8, 2013

(65) Prior Publication Data

US 2013/0302008 A1  Nov. 14, 2013

(30) Foreign Application Priority Data

May 9, 2012 (KR) .................. 10-2012-0049103

(51) Int. Cl.
*H04N 5/92* (2006.01)
*H04N 9/87* (2006.01)
*H04N 21/414* (2011.01)
*H04N 21/442* (2011.01)
*H04N 21/488* (2011.01)

(52) U.S. Cl.
CPC ............ *H04N 9/8715* (2013.01); *H04N 21/414* (2013.01); *H04N 21/41407* (2013.01); *H04N 21/4424* (2013.01); *H04N 21/4884* (2013.01)

(58) Field of Classification Search
CPC .......... H04N 21/414; H04N 21/41407; H04N 9/8715; H04N 21/4884; H04N 21/4424
USPC ........................................................ 386/244
See application file for complete search history.

(56) References Cited

U.S. PATENT DOCUMENTS

| | | | |
|---|---|---|---|
| 7,508,450 B1* | 3/2009 | Abernethy et al. | 348/465 |
| 2004/0204020 A1* | 10/2004 | Kuramitsu | 455/550.1 |
| 2004/0252979 A1* | 12/2004 | Momosaki et al. | 386/96 |
| 2006/0020991 A1* | 1/2006 | Goto | 725/106 |
| 2006/0044479 A1* | 3/2006 | Heo | 348/738 |
| 2006/0221257 A1* | 10/2006 | Nakayama | 348/738 |
| 2007/0002179 A1* | 1/2007 | Naka | 348/588 |
| 2007/0265031 A1* | 11/2007 | Koizumi et al. | 455/556.1 |
| 2008/0285948 A1* | 11/2008 | Iwase et al. | 386/95 |
| 2009/0137272 A1* | 5/2009 | Okuda et al. | 455/556.1 |
| 2010/0146445 A1* | 6/2010 | Kraut | 715/821 |
| 2010/0299445 A1* | 11/2010 | Amsterdam et al. | 709/231 |
| 2011/0187925 A1* | 8/2011 | Onoda | 348/468 |
| 2012/0047534 A1* | 2/2012 | Gharachorloo et al. | 725/53 |
| 2014/0115489 A1* | 4/2014 | Park et al. | 715/741 |

FOREIGN PATENT DOCUMENTS

| | | |
|---|---|---|
| CN | 101035213 A | 9/2007 |
| EP | 1631080 A2 | 3/2006 |
| EP | 1708497 A2 | 10/2006 |
| EP | 1654011 A1 | 8/2008 |
| JP | 2008-252746 A | 10/2008 |
| JP | 2008-300902 A | 12/2008 |

* cited by examiner

*Primary Examiner* — William Tran
(74) *Attorney, Agent, or Firm* — Birch, Stewart, Kolasch & Birch, LLP

(57) ABSTRACT

A method of controlling a mobile terminal, and which includes outputting, via a display of the mobile terminal, a first video; detecting, via a controller of the mobile terminal, an occurrence of an event on the mobile terminal; and automatically displaying or not displaying a first language caption corresponding to the first video in response to the detected event.

18 Claims, 14 Drawing Sheets

FIG. 7
(a)
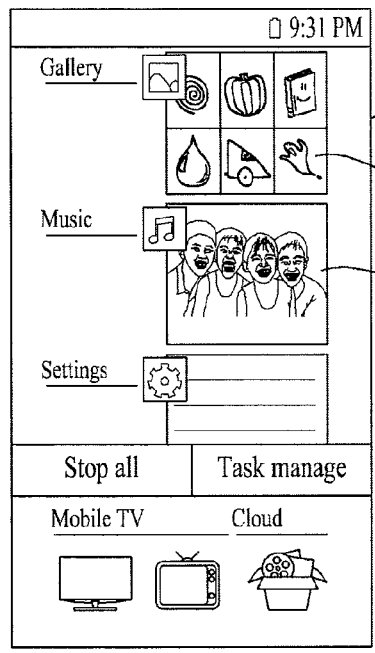
(b)
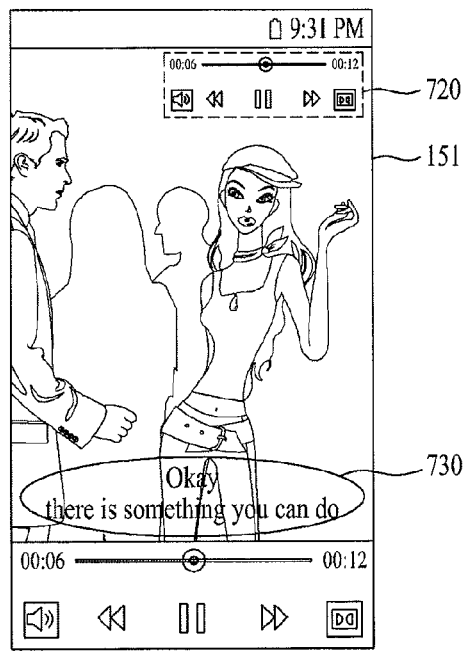
(c)
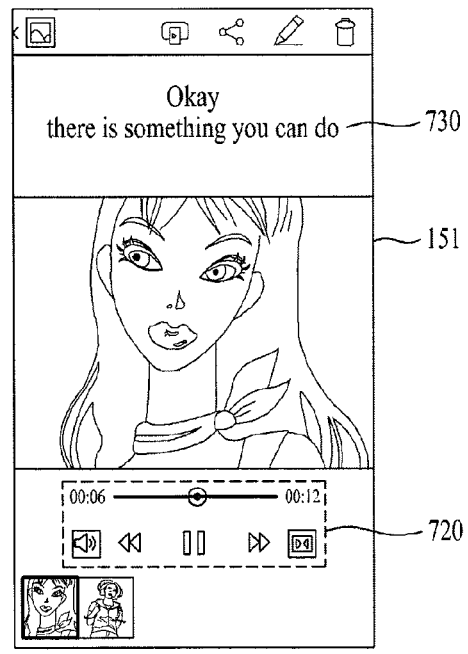
(d)

FIG. 9
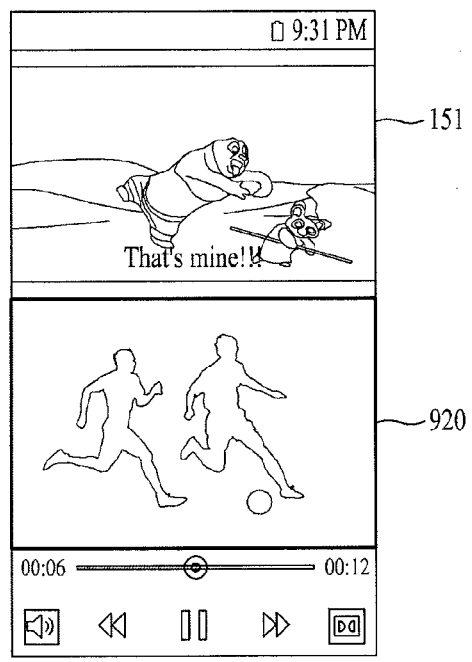
(a)
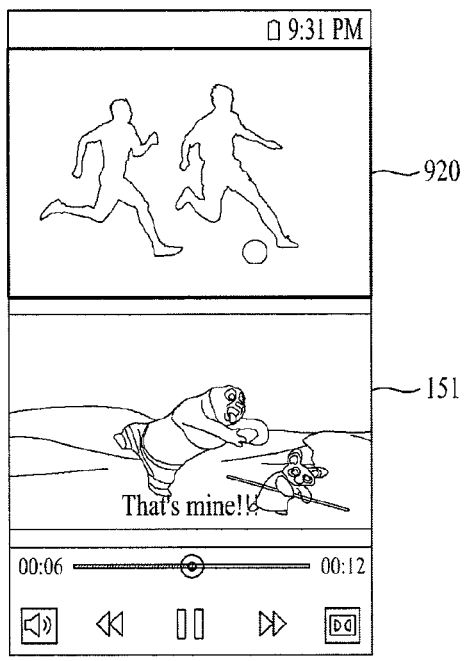
(b)

FIG. 10
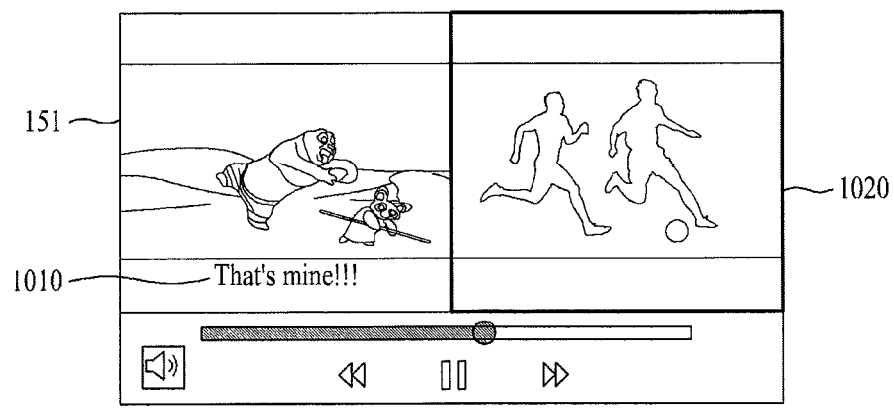
(a)
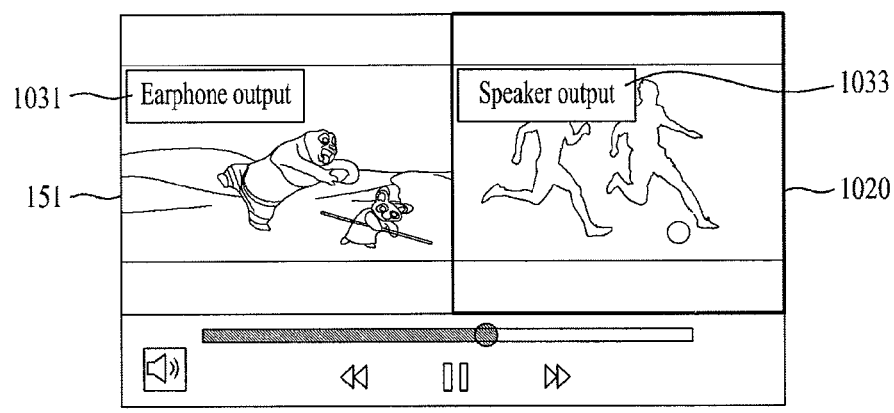
(b)
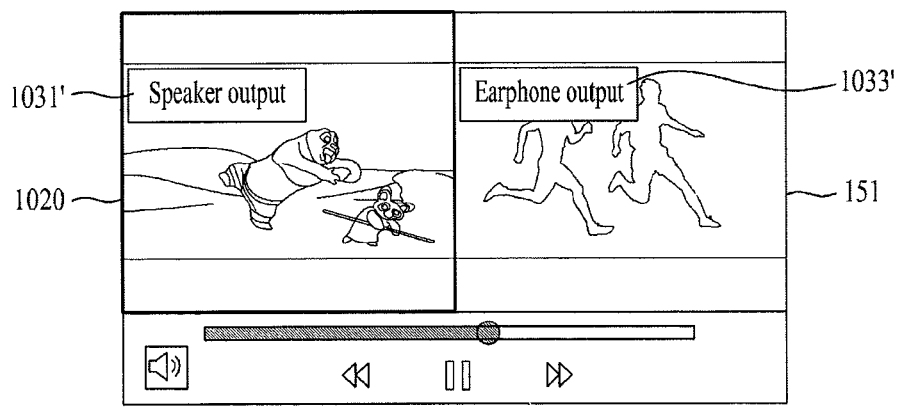
(c)

FIG. 11
(a)
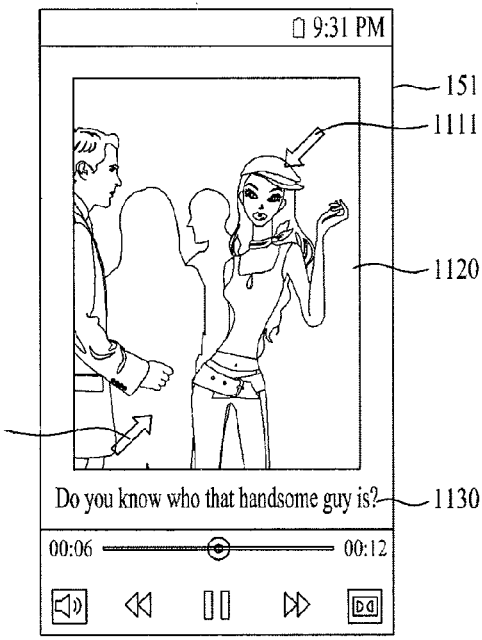
(b)
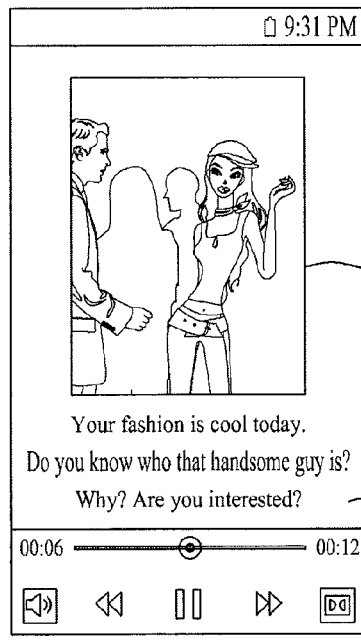
(c)
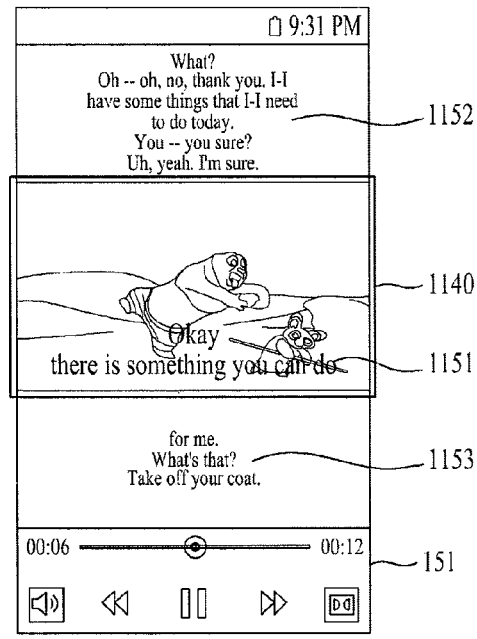
(d)

FIG. 12
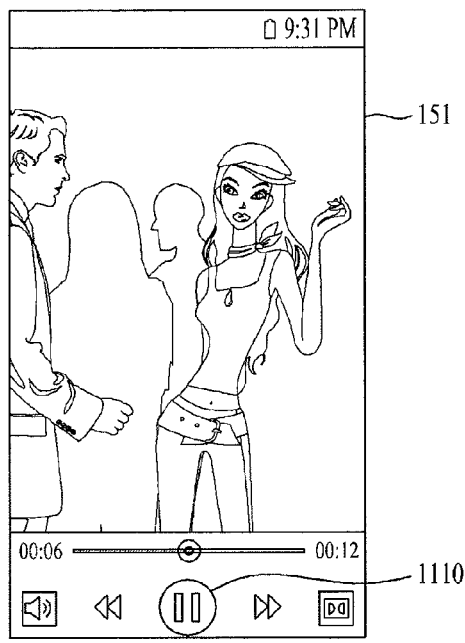
(a)
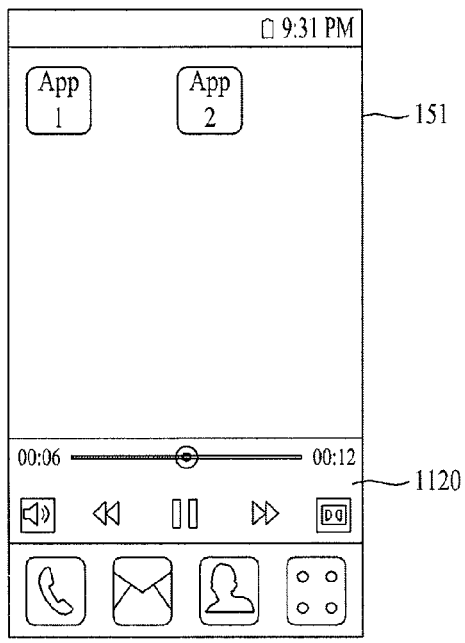
(b)
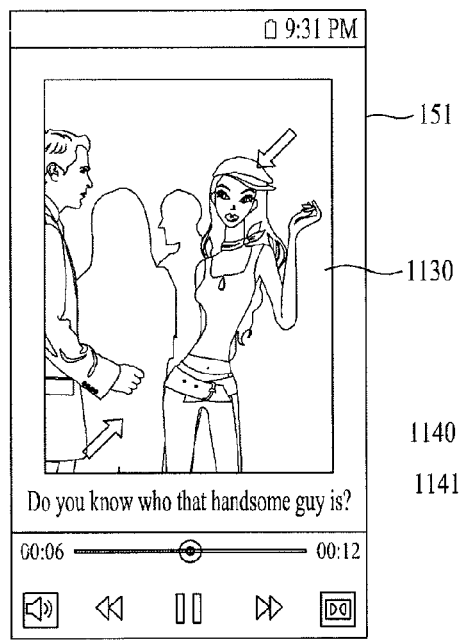
(c)
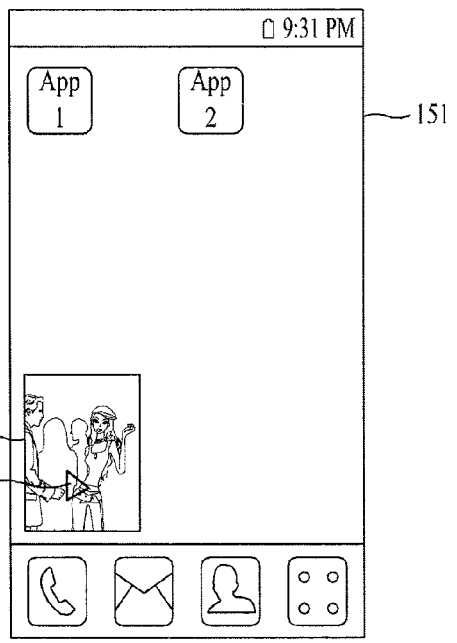
(d)

MOBILE TERMINAL AND CONTROLLING METHOD THEREOF

Pursuant to 35 U.S.C. §119(a), this application claims the benefit of earlier filing date and right of priority to Korean Patent Application No. 10-2012-0049103, filed on May 9, 2012, the contents of which are hereby incorporated by reference herein in their entirety.

BACKGROUND OF THE INVENTION

1. Field of the Invention

The present invention relates to a mobile terminal and controlling method thereof for performing various functions using such a context as a user command input and an event occurrence while playing a video.

2. Discussion of the Related Art

Generally, terminals can be classified into mobile/portable terminals and stationary terminals. The mobile terminals can be further classified into handheld terminals and vehicle mount terminals. As functions of the terminal are becoming more diversified, the terminal tends to be implemented as a multimedia player provided with composite functions such as photographing of photos or videos, playback of music or video files, game play, broadcast reception and the like for example.

Specifically, since a video increasingly tends to be watched on a mobile terminal, the user's demand for a terminal capable of providing various kinds of convenient functions is increasing.

SUMMARY OF THE INVENTION

Accordingly, the present invention is directed to a mobile terminal and controlling method thereof that substantially obviate one or more problems due to limitations and disadvantages of the related art.

One object of the present invention is to provide a mobile terminal and controlling method thereof, by which an event can be handled by being aware of a video-watching context in a manner appropriate for the context.

Another object of the present invention is to provide a mobile terminal and controlling method thereof, by which a caption can be conveniently controlled in response to a user input while playing a video.

To achieve these objects and other advantages and in accordance with the purpose of the invention, as embodied and broadly described herein, a method of controlling a mobile terminal according to one embodiment of the present invention may include the steps of playing a first video through a first application, detecting an occurrence of an event, recognizing a context of the occurrence of the event, and changing a display state of a first caption corresponding to the first video in response to the recognized context.

In another aspect of the present invention, a method of controlling a mobile terminal according to another embodiment of the present invention may include the steps of playing a first video via a first application, inputting a volume adjust command for an audio output of the first video, determining a level of a surrounding audio via a microphone when the volume adjustment, and changing whether to display a first caption corresponding to the first video in response to a direction of the volume adjustment and the determined level of the surrounding audio.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram illustrating a method of controlling a caption in accordance with a multitasking in a mobile terminal according to one embodiment of the present invention;

FIG. 9 is a diagram illustrating a method of controlling a caption when simultaneously playing two videos in a mobile terminal according to another embodiment of the present invention;

FIG. 10 is a diagram for a further example of a method of controlling a caption when simultaneously playing two videos in a mobile terminal according to one embodiment of the present invention;

FIG. 11 is a diagram illustrating changing a caption display form in response to a size change of an output image in a mobile terminal according to one embodiment of the present invention;

FIG. 12 is a diagram illustrating switching a widget in response to a pause of a video play in a mobile terminal according to another embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
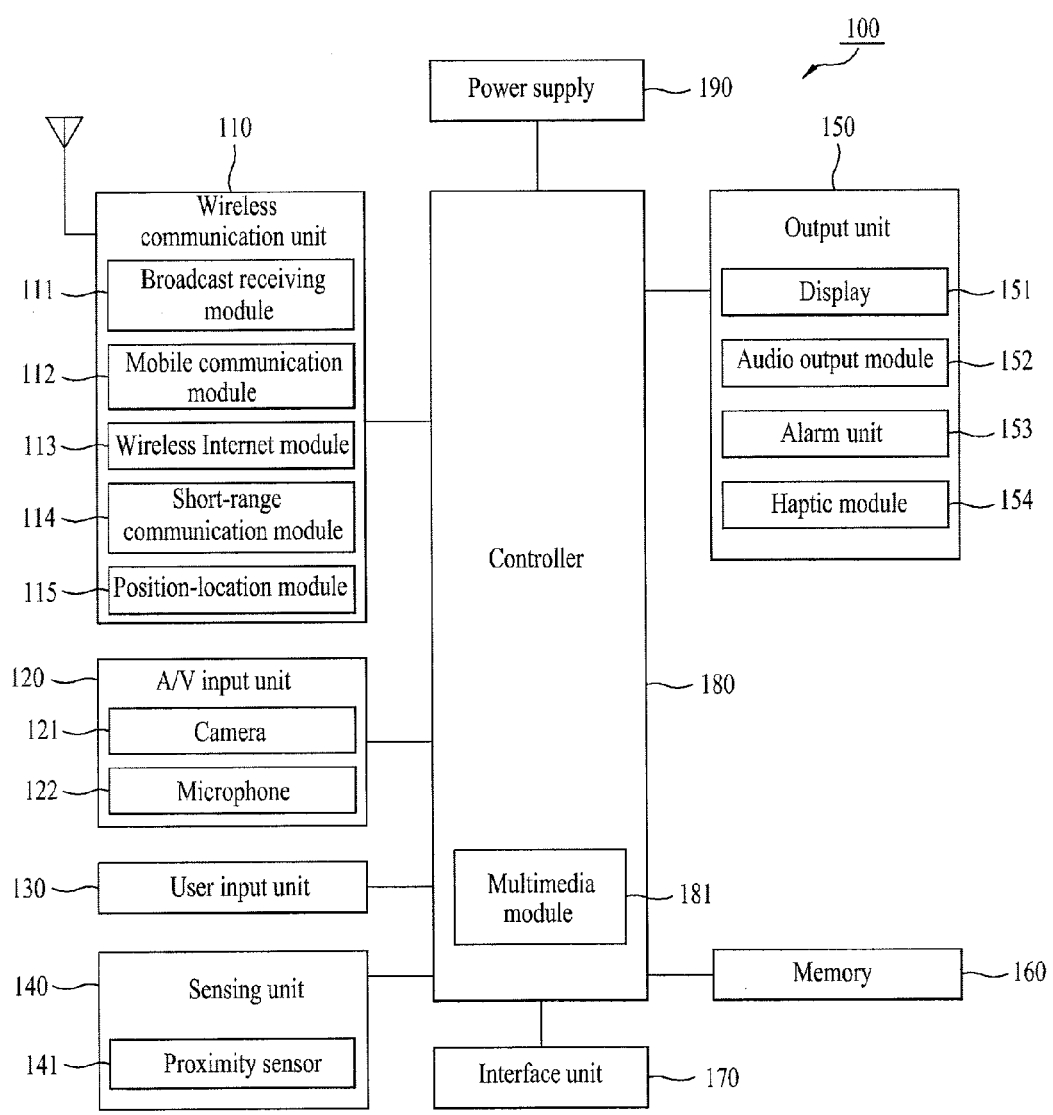
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 is able to calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated while receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100. As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user can see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, the proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. And, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 is able to output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 is able to operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
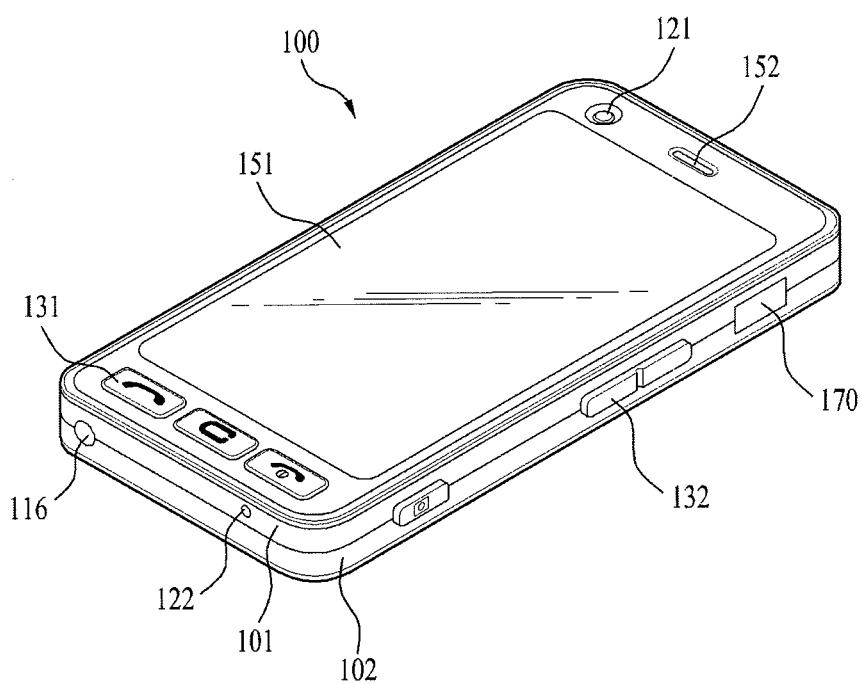
FIG. 2 is a front perspective diagram of a mobile or portable terminal according to one embodiment of the present invention.

FIG. 2 is a front perspective view of a mobile terminal according to one embodiment of the present invention.

The mobile terminal 100 illustrated in FIG. 2A has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, it is understood that such disclosure may apply equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130 (see FIG. 1).

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Figure 3:
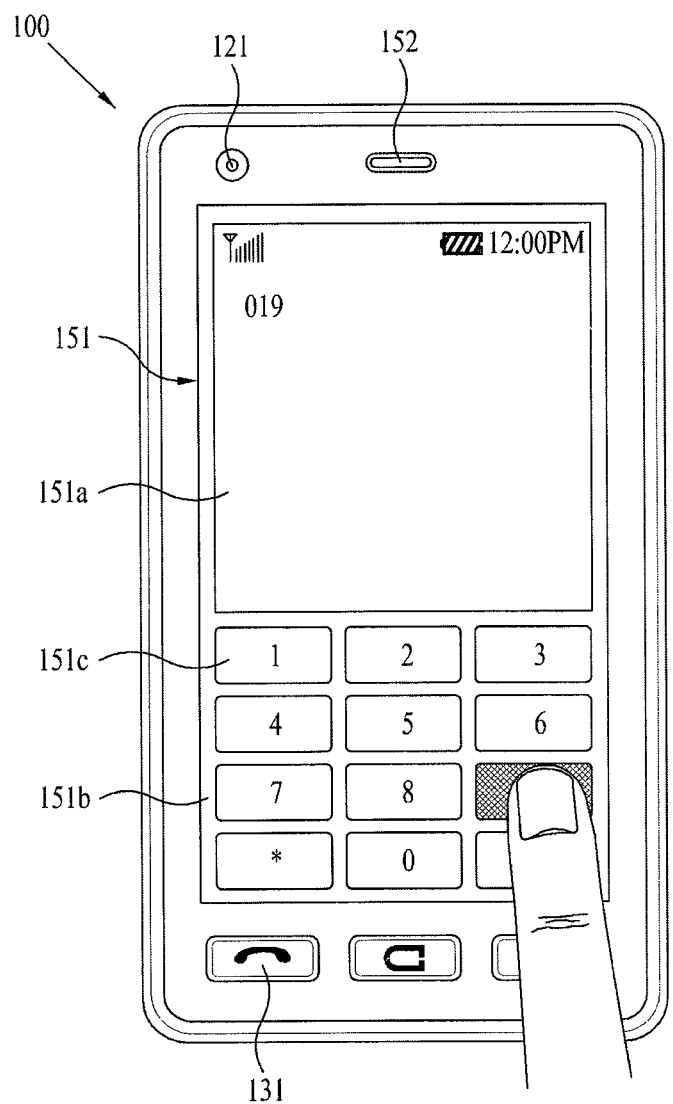
FIG. 3 is a front diagram of a mobile terminal according to one embodiment of the present invention to describe one operating status thereof.

FIG. 3 is a front-view of terminal 100 according to various embodiments of the present disclosure. Various kinds of visual information can be displayed on the display 151. Such information can be displayed in characters, numerals, symbols, graphics, icons or the like. In order to input the information, at least one of the characters, numerals, symbols, graphics and icons are represented as a single predetermined array to be implemented in a keypad formation. This keypad formation may also be referred to as 'soft keys.'

FIG. 3 shows that a touch applied to a soft key is input through a front face of a terminal body. The display 151 is operable through an entire area or by being divided into a plurality of regions. In the latter case, a plurality of the regions can be configured interoperable. For instance, an output window 151*a* and an input window 151*b* are displayed on the display 151. A soft key 151*c* representing a digit for inputting a phone number or the like is output to the input window 151*b*. If the soft key 151*c* is touched, a digit corresponding to the touched soft key is output to the output window 151*a*. If the first manipulating unit 131 is manipulated, a call connection for the phone number displayed on the output window 151*a* is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, when a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135. It should be appreciated that other types of touch inputs may also be used.

Meanwhile, such a graphic for pointing at a specific object on a display or selecting a menu from the display as an arrow, a finger or the like is called a pointer or a cursor. Yet, the pointer is frequently used to mean a finger, a stylus pen or the like for a touch manipulation or the like. In order to clearly discriminate the pointer and the cursor from each other in this disclosure, a graphic displayed on a display is named a cursor and such a physical means for performing a touch, a proximity touch, a gesture or the like as a finger, a stylus pen or the like is named a pointer.

Generally, an application is used in the concept of the separately installed/executed software. Yet, an application mentioned in the description of the present invention conceptually indicates all targets that display visually information on a prescribed region in activating a specific function. The controller 180 of the mobile terminal according to the present invention can control at least two applications at the same time. And, the active applications may be simultaneously displayed as partitioned screens on the display unit 151 or a display unit provided to another image display means provided to the mobile terminal and/or another external device connected to the mobile terminal. Alternatively, one of the active applications may be displayed as a full screen on the display unit 151 or a display unit provided to another image display means provided to the mobile terminal and/or another external device connected to the mobile terminal in a manner of covering at least one portion of a region related to another application. Moreover, assume that the controller 180 of the mobile terminal 100 according to the present invention can perform a multitasking function of simultaneously activating and controlling the above-mentioned at least two applications.

Caption Control Per Context in Response to Event Occurrence

According to one embodiment of the present invention, when an event occurs while watching a video, the controller 180 of the mobile terminal 100 recognizes the corresponding context and then controls a caption of the video to suit the recognized context correspondingly. This is described with reference to FIG. 4 as follows.

Figure 4:
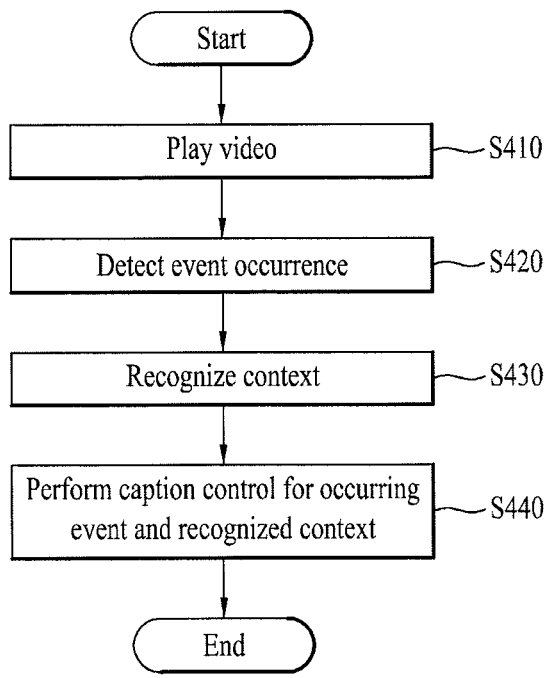
FIG. 4 is a flowchart illustrating a method of controlling a caption while playing a video according to one embodiment of the present invention.

In particular, FIG. 4 is a flowchart illustrating a method of controlling a caption while playing a video according to one embodiment of the present invention. Referring to FIG. 4, a video is played back in the mobile terminal (S410). In particular, the video can be played back in one of a context of activating an application for a video play in response to a user's command input, a context of loading a webpage including a video via a web browser, and the like. Moreover, a source of the video may be previously saved in the memory 160 of the mobile terminal 100 or may be obtained from the memory 160 by streaming.

While the video is being played, the controller 180 may detect an occurrence of an event (S420). In this instance, the event occurrence may include one of user's command input via the user input unit 130, a call signal or message reception from an external device via the wireless communication unit 110, a mobile terminal motion detected by the sensing unit 140, a connection/disconnection of an earphone jack and the like. In particular, the user's command input may include one of a video volume adjustment, a video size adjustment, an input of a command for activating another application, an input of a command for playing at least two videos simultaneously, and the like.

Once the event occurs, the controller 180 performs a context awareness in association with the event occurrence (S430). In this instance, what kind of information the controller 180 will apply to the context awareness may differ depending on a type of the event. For instance, if a volume of a video audio is changed through a user's command input, the controller 180 can determine whether a surrounding is quiet or noisy using the microphone 122. Moreover, if another application is activated, the controller 180 can determine whether the corresponding application uses an audio output. In another instance, if a landscape-portrait direction is changed using a motion of the mobile terminal 100, the controller 180 can determine a screen ratio (i.e., vertical-horizontal direction) of the currently played video. In another instance, when there is an incoming call signal, the controller 180 can determine a user's call acceptance or a user's call rejection.

Having performed the context awareness in response to the event occurrence, the controller 180 can change a display state of a caption corresponding to the currently played video (S440). In this instance, the display state may include ON/OFF of the caption, a size of the caption, an arranged position of the caption on the video play screen, a display size of the caption and the like.

Meanwhile, a caption for a corresponding video needs to exist for the caption control. For clarity, according to the present embodiment, assume that the caption corresponding to the currently played video is already prepared in the memory 160. Alternatively, if a caption is not prepared in the memory 160 yet, the controller 180 searches a web server and the like for the caption via the wireless communication unit 110 using such an information for identifying a video as a meta information of the video, a header information of the video, a size of the video, a file name of the video and the like and is then able to download the found caption. Alternatively, when a video of a streaming service type is played, the mobile terminal 100 can obtain a caption information contained in streaming data. The caption can also be a language caption indicating a written language of word being spoken on the video.

A method of controlling a caption per context according to the present embodiment is described in detail with reference to FIGS. 5 to 11 as follows. In the following embodiments including the embodiment shown in FIG. 5, a video is played through a video play dedicated application, and a caption is not initially displayed.

Figure 5:
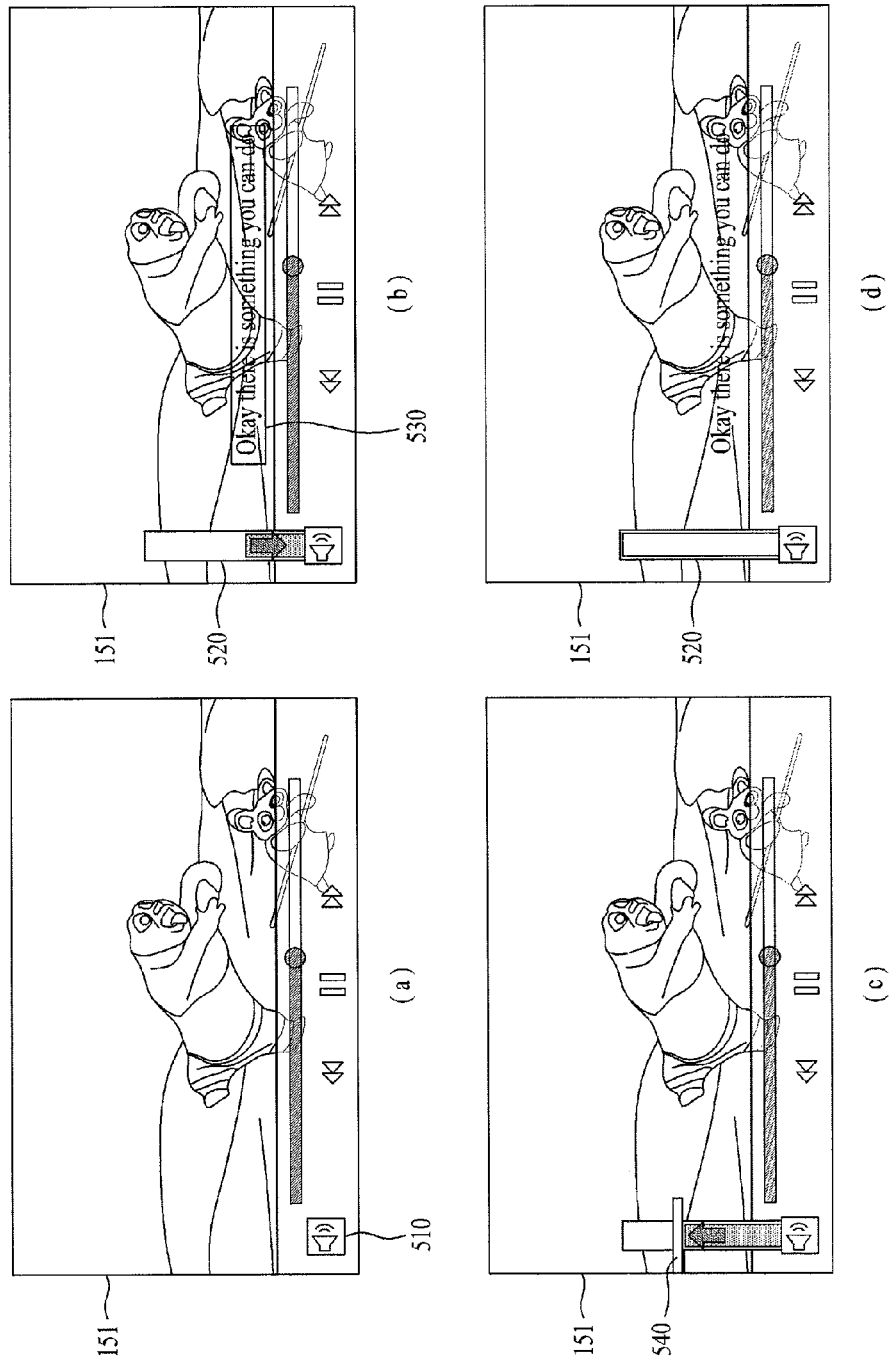
FIG. 5 is a diagram illustrating a method of controlling a caption in accordance with a volume adjustment in a mobile terminal according to one embodiment of the present invention.

FIG. 5 is a diagram illustrating a method of controlling a caption in accordance with a volume adjustment in a mobile terminal according to one embodiment of the present invention. Referring to FIG. 5, while a video is being played via the touchscreen 151 of the mobile terminal 100 (FIG. 5(a)), a volume adjust menu 510 is selected and a volume gauge 520 is lowered down below a predetermined value. Thus, when a caption is not currently displayed, the controller 180 displays a caption 530, which corresponds to the currently played video (FIG. 5(b)).

In particular, the controller 180 determines that a user lowers the volume in a quiet place, and displays the caption to supplement a low sound. Further, to raise the accuracy of this context awareness, when a user adjusts a volume, the controller 180 activates the microphone 122 to determine whether a surrounding is noisy. In one embodiment, only if a surrounding noise is equal to or smaller than a predetermined value, the controller 180 can display the caption.

Meanwhile, if the volume gauge 530 rapidly increases even though the controller 180 determines the surrounding level is low, the controller 180 can interrupt the volume increase by configuring a temporary block line 540 (FIG. 5(c)). After the temporary block line 540 has been displayed, if a command for increasing the volume is input again, the controller 180 can increase the volume in response to the corresponding command.

When a command for a volume increase is input, if the controller 180 determines that a level of the surrounding noise is equal to or greater than a predetermined value, the controller 180 can display a caption (FIG. 5(d)). This action is taken because it is difficult to discriminate a sound due to the surrounding noise despite the volume increase command. As a result of the awareness of the controller 180, the caption is displayed to help the user watch the video. When the controller 180 is configured not to recognize the surrounding noise, after the volume has reached the maximum level, if the command for increasing the volume is repeatedly input, the controller 180 recognizes the repeated command as a caption call command and then displays the caption.

Optionally, a touch sensor or a luminous intensity sensor may be provided to a part adjacent to the audio output unit 152 provided to the body of the mobile terminal 100. If a touch signal is detected via the touch sensor or the luminous intensity sensor senses that a surrounding of the audio output unit 152 suddenly gets dark, the controller 180 may display the caption. This may be a result corresponding to the user blocking the audio output unit 152 with their hand, for example, which is recognized by the controller 180. In this instance, the controller 180 can automatically lower the volume value into a level equal to or smaller than a predetermined value while displaying a caption.

Although FIG. 5 shows the example of adjusting the volume of the video by controlling the volume gauge 520 displayed by a selection of the volume adjust menu 510, the volume may be adjusted by a touch input of a specific pattern or the hardware key button 132 provided to the mobile terminal body.

Figure 6:
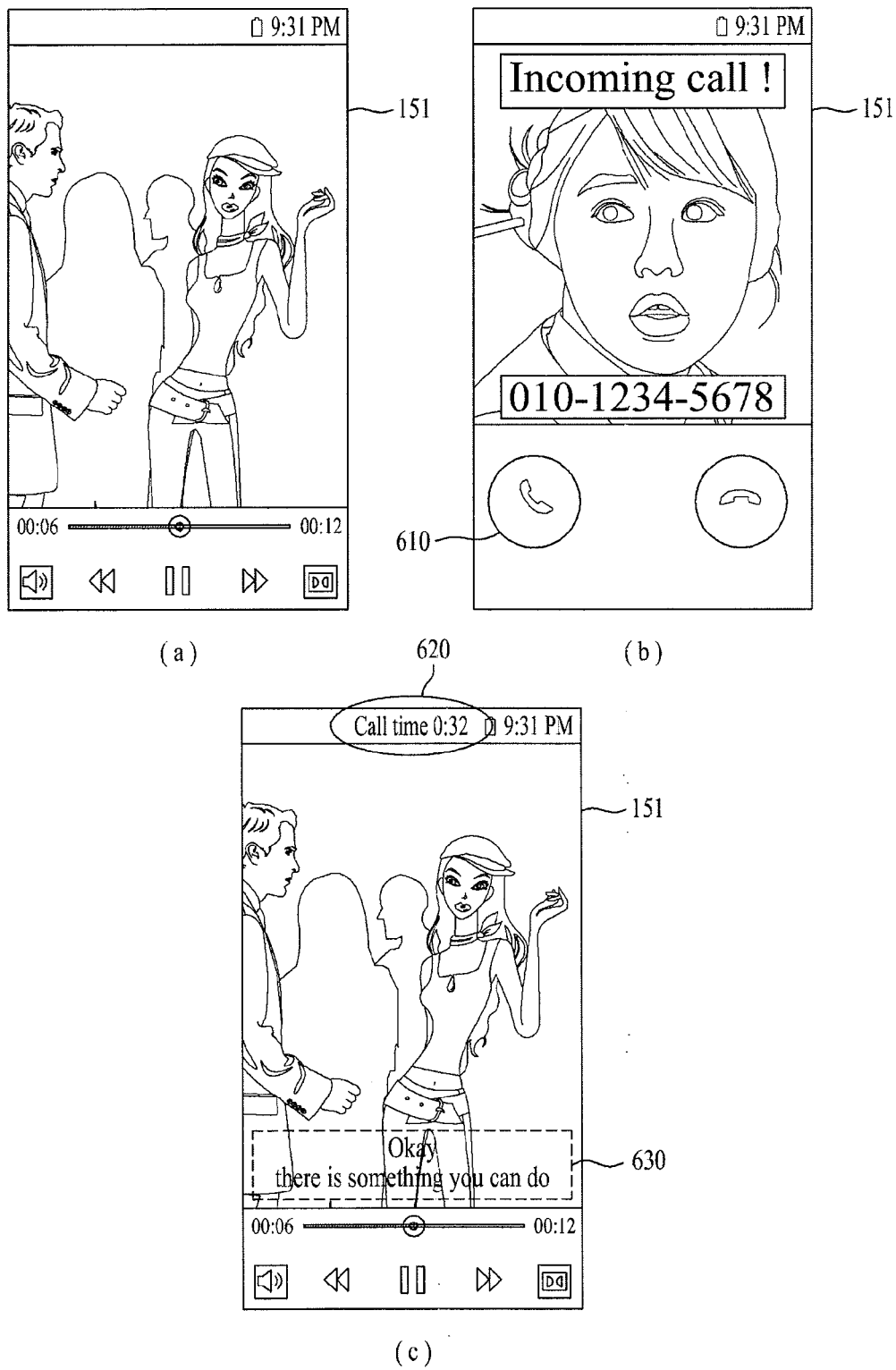
FIG. 6 is a diagram illustrating a method of controlling a caption in accordance with an incoming call signal in a mobile terminal according to one embodiment of the present invention.

Next, FIG. 6 is a diagram illustrating a method of controlling a caption in accordance with an incoming call signal in a mobile terminal according to one embodiment of the present invention.

Referring to FIG. 6, while a video is played via the touchscreen 151 of the mobile terminal 100 (FIG. 6(*a*)), and if a call signal is received via the wireless communication unit 110, the controller 180 displays a user interface for selecting whether to accept or reject a call (FIG. 6(*b*)). If the user selects a call accept menu 610, the controller 180 displays a caption 630 when the video play resumes (FIG. 6(*c*)). Thus, the controller 180 can output a call related audio via the audio output unit 152 only instead of the audio of the video. Moreover, the controller 180 can display a call related information 620 such as a current call time and the like on a prescribed region of the touchscreen 151. Accordingly, when the user responds to the external event occurrence, the user can still watch the video without interruption because the caption is automatically displayed.

Next, a caption control in response to an additional activation of a different application is explained. First of all, when a different application is additionally activated, the controller 180 considers such an item for context awareness as whether the additionally activated application is accompanied with an audio output. If the additionally activated application is accompanied with the audio output, the controller 180 may display the caption while maintaining a video output, instead of turning off an audio output of a video. On the contrary, if the additionally activated application is not accompanied with the audio output, the controller 180 can replace the video output of the video by the additionally activated application only. This is described with reference to FIG. 7 as follows.

In particular, FIG. 7 is a diagram illustrating a method of controlling a caption in accordance with a multitasking in a mobile terminal according to one embodiment of the present invention. Referring to FIG. 7, while a video is played via the touchscreen 151 of the mobile terminal 100 (FIG. 7(*a*)), the controller 180 displays a list of recently activated applications in response to a prescribed command input (e.g., a long touch to a home key, etc.) (FIG. 7(*b*)).

If the user selects a music play application 713 from the application list, the controller 180 displays a control panel 720 of the music play application by being overlaid on a video play application (FIG. 7(*c*)). In doing so, the controller 180 may control an audio, which is played through the music play application, to be output via the audio output unit 152 instead of the audio of the video in response to a manipulation of the control panel 720. Simultaneously, the controller 180 can activate a caption 730 of the video.

Because the control panel 720 may interrupt the video watching, if the control panel 720 is not manipulated for prescribed duration, the control panel 720 may disappear. After the control panel 720 has disappeared, and if a touch input to a corresponding part on the touchscreen is detected, the control panel 720 may be displayed again on the touchscreen.

Meanwhile, if a gallery (image file play) application 711 is selected in the context shown in FIG. 7(*b*), the controller 180 displays the control panel 720 of the video application on a nearby space, on which an image is not displayed, while the gallery application is activated (FIG. 7(*d*)). If a video play command is input via the control panel 720, the controller 180 outputs an audio of the video via the audio output unit 152 and also displays a caption 730 of the played video around a displayed image.

In the following description, while one video is played, a caption control in response to an additional selection of another video to be simultaneously played is explained. First of all, when a different video is simultaneously played, the controller 180 may consider such an item for context awareness as which video is a control target. If a control target video is specified, a prescribed visual effect may be given to the corresponding video.

In addition, an audio of the control target video may be set to be output, while a caption of another video is set to be output without audio. Of course, when a play command for each of the two videos is input, images can be simultaneously played irrespective of a presence or non-presence of the control target. This is described with reference to FIGS. 8 to 10 as follows.

Figure 8:
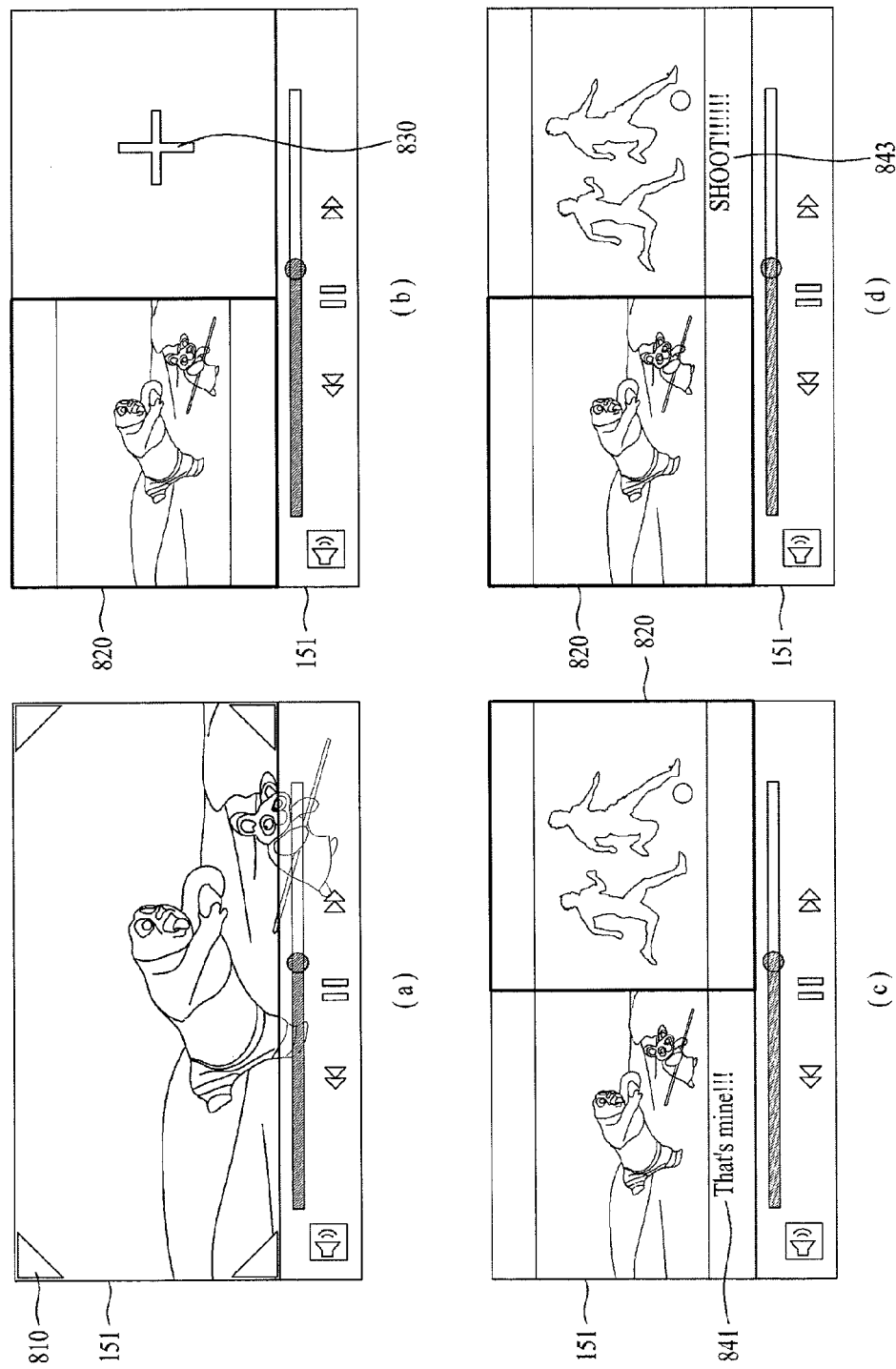
FIG. 8 is a diagram illustrating a method of controlling a caption when simultaneously playing two videos in a mobile terminal according to one embodiment of the present invention.

In particular, FIG. 8 is a diagram illustrating a method of controlling a caption when simultaneously playing two videos in a mobile terminal according to one embodiment of the present invention. Referring to FIG. 8, while a video is played via a video play application, and if a prescribed command (e.g., a long touch) is input to the touchscreen, the controller 180 displays a size adjust indicator 810 on each of four (4) corners of a play region (FIG. 8(*a*)).

If at least one of the four (4) size adjust indicators is touched & dragged, a size of the play region may be changed. If the size of the play region is reduced into a size equal to or smaller than a predetermined size, the controller 180 displays a control indicator 820, which indicates a control target video, around the play region of the previously played video (FIG. 8(*b*)). Moreover, the controller 180 displays an add indicator 830 for adding a new video on an empty space, which is generated as the play region of the previously played video is reduced.

If the user selects the add indicator 830, a list of videos, for which the memory 160 was previously searched, or a browser for finding a video to add from a file system may be displayed. If a video to be newly added is specified, the controller 180 can move the control indicator 820 to a play region of the newly added video.

Subsequently, an audio of the newly added video is output via the audio output unit 152 and the controller 180 displays a caption 841 on the previous video (FIG. 8(*c*)). If the user selects the play region of the previous video, the controller 180 displays the control indictor 820 and outputs the audio of the previous video via the audio output unit 152 as well (FIG. 8(*d*)). Moreover, the audio output of the added video is stopped and a caption 843 is displayed instead.

In the context shown in FIG. 8(*c*) or FIG. 8(*d*), if a volume of the volume, to which the control indicator 820 is given, is lowered to a level equal to or smaller than a predetermined level, the controller 180 displays the caption shown in FIG. 5(*b*).

Meanwhile, instead of dragging the size adjust indicator 810 displayed in response to the long touch input for the size adjustment of the play region, the user can apply multiple touches to two different points, reduce a distance between the two touch points by maintaining the touch contacts, and release the multiple touches or a method of selecting a screen partitioning function by a prescribed menu manipulation.

The former description with reference to FIG. 8 is made based on a landscape mode. A case of switching the landscape mode of the mobile terminal to a portrait mode is described with reference to FIG. 9 as follows.

FIG. 9 is a diagram for another example of a method of controlling a caption when simultaneously playing two videos in a mobile terminal according to one embodiment of the present invention. Referring to FIG. 9, in the context shown in FIG. 8(*c*), the controller 180 displays an arranged direction of the mobile terminal in response to a switching to a landscape mode to a portrait mode. In this instance, if a touch & drag input in top end direction is detected from a play region, on which a control indicator 920 is displayed, provided to a bottom part (FIG. 9(a)), the controller 180 may switch locations of two videos (FIG. 9(b)).

Meanwhile, while two videos are simultaneously played, an insertion of an earphone may be detected. These features are described with reference to FIG. 10 as follows.

In particular, FIG. 10 is a diagram illustrating another example of a method of controlling a caption when simultaneously playing two videos in a mobile terminal according to one embodiment of the present invention. Referring to FIG. 10(a), two videos are simultaneously played in a screen partitioning form by the method described with reference to FIG. 8. A control indicator 1020 is given to the right video and an audio of the right video is being output via an audio output unit. Simultaneously an audio of the left video is not output but a caption 1010 is being displayed instead.

Then, if an earphone is connected to a mobile terminal, referring to FIG. 10(b), the controller 180 displays text 1031 indicating that an audio is output to the earphone, on a play region of the left video. In addition, the controller 180 displays text 1033 indicating that an audio is output via a speaker, i.e., the audio output unit, on a play region of the right video. Moreover, the controller 180 starts to output the audio of the left video to the earphone. Further, the audio of the right video may continue to be output to the audio output unit in the same manner before the earphone connection.

Thus, referring to FIG. 10(c), if the left video is changed into a control target video (i.e., if the play region of the left video is selected), the control indicator 102 is given to the left video. Subsequently, the controller 180 displays text 1031 indicating that the audio is output via the audio output unit, on the play region of the left video, while displaying text 1033 indicating that the audio is output via the earphone, on the play region of the right video. Moreover, the audio of the left video is output to the audio output unit, while the audio of the right video is output via the earphone.

The earphone shown in FIG. 10 is provided as an example. In addition, the present invention is applicable to a wireless connection to an external audio output device by short range communication such as Bluetooth and the like as well as a wired connection to such an external audio output device as a speaker, an earphone and the like.

The methods mentioned in the foregoing description with reference to FIGS. 8 to 10 may be specifically useful for when two users simultaneously watch different videos via a single mobile terminal.

Next, FIG. 11 is a diagram illustrating changing a caption display form in response to a size change of an output image in a mobile terminal according to one embodiment of the present invention. Referring to FIG. 11, a video suitable for a portrait mode is being played on the touchscreen 151 of the mobile terminal 100 (FIG. 11(a)). After a touch input has been simultaneously input to two points 1111 and 1113 (FIG. 11(b)), and if a distance between the two touch points are reduced in the arrow direction by maintaining the touch contact state, a size of an output image 1120 may be correspondingly reduced.

If an empty space generated from the size reduction of the output image 1120 is equal to or greater than a predetermined size, the controller 180 may display a caption 1130, which corresponds to the currently played video, on the corresponding region. Thereafter, as the size of the output image is further reduced into a size of the image 1120' (FIG. 11(c)), the empty space further increases owing to the reduced output image 1120'. Hence, the controller 180 may display a more caption 1130'.

While the video suitable for the landscape mode is being played in the landscape mode, and if the landscape mode is switched to a portrait mode (FIG. 11(d)), a size of an output image 1140 of the video is reduced by maintaining a horizontal-vertical ratio. The controller 180 displays a caption 1151 appropriate for a currently play point on the reduced output image 1140. Moreover, the controller 180 displays a caption 1152 previous to the current point and a caption 1153 next to the current point above and below the reduced output image 1140, respectively.

According to the embodiments mentioned in the foregoing description, the controller 180 can determine whether to display a caption of a previously played video in the context awareness step S430. When a caption is not displayed, the controller 180 may display the caption in the step S440. In particular, in the context that the caption is already being displayed, the controller 180 may control the caption display state to keep being maintained without addition operation in response to an event occurrence.

Side Functions

In the following description, side functions while playing a video according to another embodiment of the present invention are explained with reference to FIGS. 12 to 14. The side functions may be performed separately or together with a caption control through context awareness according to one embodiment of the present invention.

For example, a widget switching of a video application is described with reference to FIG. 12 as follows. FIG. 12 is a diagram illustrating switching a widget in response to a pause of a video play in a mobile terminal according to another embodiment of the present invention.

Referring to FIG. 12, while a video is being played via a video play application, and if a pause button 1210 is long touched (FIG. 12(a)), the video play application turns into a widget form 1220 to be arranged on an empty space of a home screen (FIG. 12 (b)). If the user selects a play of the video via the widget 1220, the widget disappears from the home screen and the home screen may return to the state shown in FIG. 12(a)).

Similar to the former method described with reference to FIG. 11 (b), if an output image 1230 is gradually reduced into a size equal to or smaller than a predetermined size (FIG. 12(c)), the play of the video pauses and a widget 1240 including the screenshot at the moment of the pause may be generated from an empty space of the home screen (FIG. 12(d)). Further, the controller 180 displays a play button 1241 on a center of the widget 1240. If the play button 1241 is selected, the widget 1240 disappears from the home screen and the home screen may return to the state shown in FIG. 12(a).

Thus, a play can be resumed from the pausing part. Through the above-described method, a user can conveniently check whether a video has paused while playing the video. Moreover, the user can conveniently check how far the video is played and is also able to resume the playback from the corresponding part.

In the following description, a method of inputting a command step by step by a simultaneous manipulation performed on a hardware key button and a touch screen is explained with reference to FIG. 13.

Figure 13:
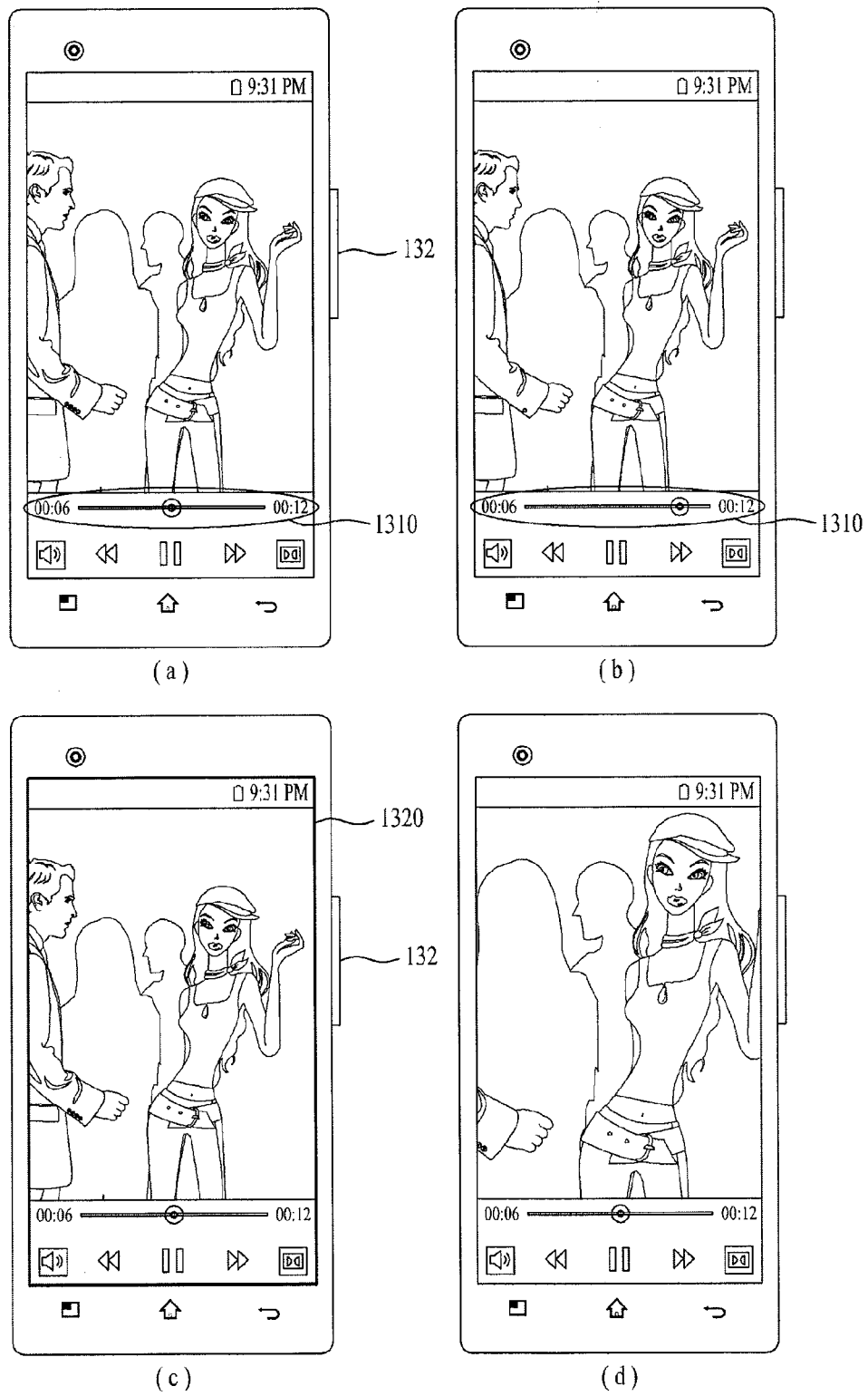
FIG. 13 is a diagram illustrating performing a step-by-step function by a combination of a touch input and a key button in a mobile terminal according to another embodiment of the present invention.

FIG. 13 is a diagram illustrating performing a step-by-step function by a combination of a touch input and a key button in a mobile terminal according to another embodiment of the present invention. Referring to FIG. 13, while a video is being played in a mobile terminal, and if a user manipulates a volume adjust key button 132 provided to a lateral side of the mobile terminal while maintaining a touch input to a region 1310 of a progress bar 1310 (FIG. 13(a)), a play point may be changed by a predetermined interval (e.g., 5 seconds, 10 seconds, etc.) each time the key button 132 is manipulated.

When the key button 132 is pressed over a prescribed duration, a search speed may increase in proportion to a pressed time. A direction (e.g., forward, backward, etc.) of the play point change may be determined depending on a type of the key button 132. In particular, if the key button 132 is manipulated in (+) direction (e.g., a volume-up key), the play point may be changed into a next point. Further, if the key button 132 is manipulated in a (−) direction, the play point may be changed into a previous point. Of course, the play point may be changed in reverse direction in accordance with settings.

If the key button 132 is manipulated while a touch input (or a multi-touch input) is applied not to the progress bar 1310 but to an output image 1320 (FIG. 13(c)), a size of the output image may be changed by a predetermined ratio unit amounting to the number of manipulations performed on the key button 132. FIG. 13(d) shows one example that the size of the output image has increased.

Further, a control amount may be differentiated in response to the number of simultaneously input touch points as well as to the simultaneous manipulation of the hardware key button and the touchscreen. For instance, while a video is being played, and if a touch & drag in vertical direction is input to a play region, a volume is changed in response to the drag direction. In particular, a volume change amount of a touch drag input in a prescribed distance with two fingers may be twice greater than that of a touch drag input in the same distance with a single finger.

Meanwhile, when performing 'fast forward' or 'fast rewind' for a video search in general, since a currently played screen is changed to fit a search point, it is difficult to perform a continuous video play while the search. In order to solve such a difficult problem, according to the present invention, if a search command is input, a play image is set to remain as it is. In addition, a separate overlay window is created to enable the search to be performed on the overlay window. This is described with reference to FIG. 14 as follows.

Figure 14:
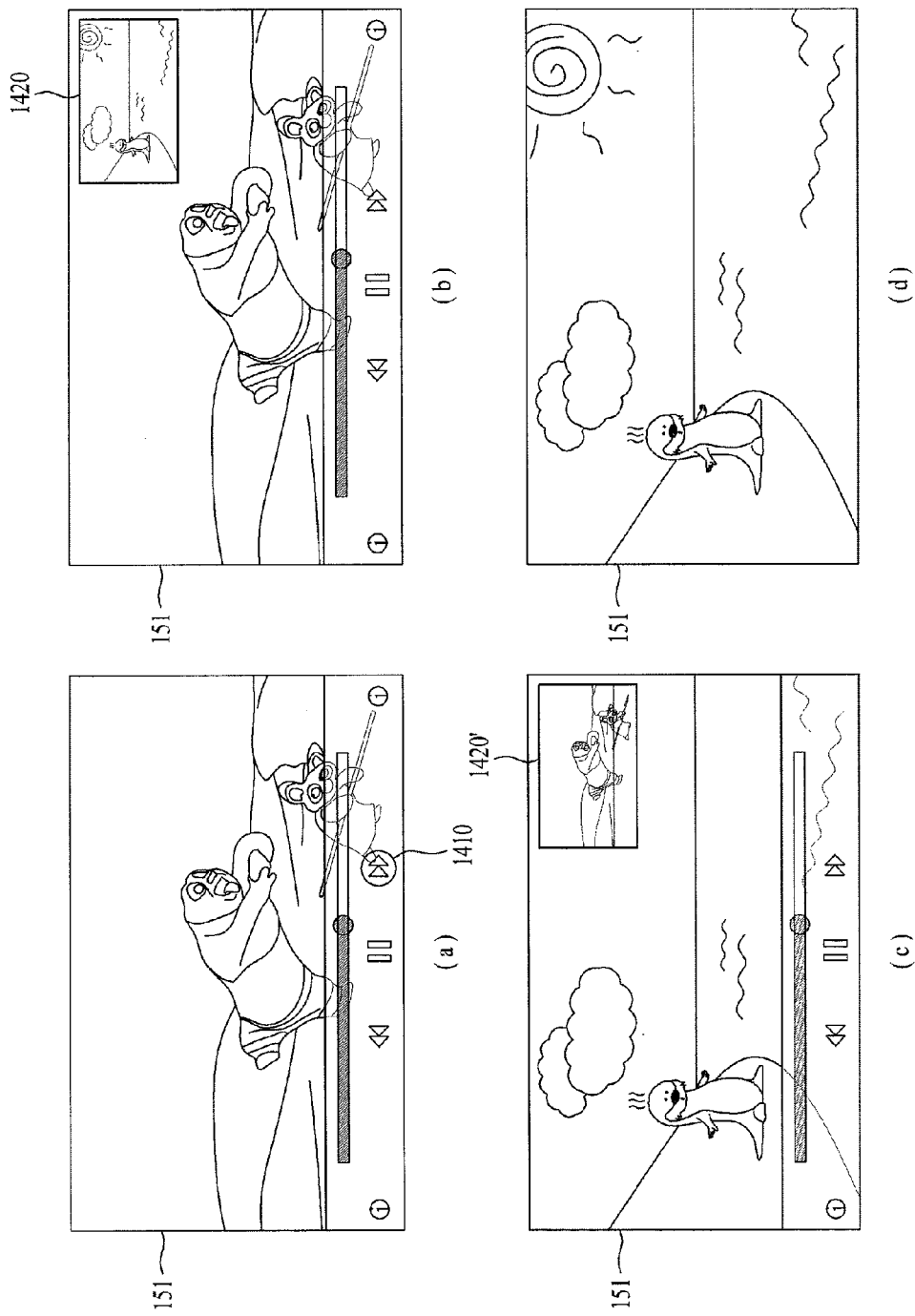
FIG. 14 is a diagram illustrating a method of performing a search function in a mobile terminal according to another embodiment of the present invention.

FIG. 14 is a diagram illustrating a method of performing a search function in a mobile terminal according to another embodiment of the present invention. Referring to FIG. 14, while a video is being played, a fast forward button 1410 is manipulated (FIG. 14(a)). While the manipulation of the button is maintained, a play state of the video is intact (i.e., the play state keeps being maintained), an overlay window 1420 is created on a side of a play screen, and a search image (i.e., a fast-forwarded image) is displayed within the overlay window 1420 (FIG. 14(b)).

If the touch input to the fast forward button 1410 is released, the played image is displayed on the overlay window 1420' and a search screen may be displayed as a full screen (FIG. 14(c)). In doing so, if a touch input is applied to the overlay window 1420', it may return to the state shown in FIG. 14(a). If there is no user input for prescribed duration, the overlay window may disappear (FIG. 14 (d)).

Meanwhile, if the overlay window located region is touched within a prescribed time from the overlay window disappearing point, the overlay window in the former state at the overlay window disappearing point may be brought back.

Through the above-described method, a user can maintain the play state of the video without interruption irrespective of the search. After the playback has been interrupted due to the end of the video play application, the stop of the video play via the home key manipulation and the like, if the video play application is activated again, the play of the video is resumed from the interrupted point in general.

However, in the mobile terminal according to the present embodiment, the playback may be resumed by starting from a timing point ahead of a prescribed time from the interrupted point. Such a function enables a user to watch an image previous to the interrupted point in part, thereby reminding the user of previous contents.

While a video is being played, a screen is turned off by manipulating a power or lock button. In doing so, if the volume key button 132 is manipulated within a prescribed time from a timing point of the button manipulation, the controller 180 may control an audio of the video to be output via the audio output unit 152 while maintaining the screen-off state.

In order to increase a play time, if a remaining battery level is lowered below a predetermined level, the controller 180 decreases a brightness of the touchscreen and lowers a volume in addition. Moreover, the controller 180 deactivates the audio output unit and also controls a caption to be displayed.

The above-mentioned embodiments are described centering on the video play environment and may be applicable to a music play application except the part related to a play image. In this instance, a caption of a video may be replaced by the words of a song.

Accordingly, the present invention provides the following effects and/or features.

First of all, a user can watch a video more conveniently through a mobile terminal according to at least one embodiment of the present invention. Secondly, when an event occurs while playing a video, the present invention controls captions in response to a context, thereby providing a user with a more convenient video-watching environment.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include transmission via Internet.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a mobile terminal, the method comprising:
displaying, via a display of the mobile terminal, a first video;

detecting, via a controller of the mobile terminal, an occurrence of an event on the mobile terminal; and selectively displaying a first language caption corresponding to the first video in response to the detected occurrence of the event, wherein the event comprises an activation of an application different than the first video being displayed, and wherein the selectively displaying comprises:

determining whether the application includes a video output;

maintaining the displaying of the first video if it is determined that the application does not include the video output, wherein a first control panel for controlling the first video is displayed with a second control panel for controlling the application, wherein the second control panel disappears after a prescribed period lapses such that the first video is able to be displayed fully, and wherein the controlling of the first video and the controlling of the application are performed simultaneously; and output an image of the application by interrupting the displaying of the first video if the application includes the video output, while displaying the first language caption on the image of the application and outputting an audio output of the first video.

2. The method of claim 1, further comprising:

measuring, via a microphone of the mobile terminal, a level of a surrounding noise surrounding the mobile terminal, wherein the first language caption is displayed if the measured level of the surrounding noise is equal to or greater than a predetermined value.

3. The method of claim 1, wherein the event excludes a command for displaying the first language caption.

4. The method of claim 2, wherein the detected event is an input of a volume adjust command, wherein if the input of the volume adjust command is a volume-down command and the measured level of the noise is equal to or smaller than the predetermined value, the first language caption is displayed, and wherein if the input of the volume adjust command is a volume-up command and the measured level of the noise is equal to or greater than the predetermined value, the first language caption is displayed.

5. The method of claim 1, wherein the event occurring on the mobile terminal includes an input of a volume-up command, and wherein the first language caption is displayed if a current volume corresponds to a maximum volume value and the first language caption is not displayed.

6. The method of claim 1, wherein the event comprises a reception of an incoming call, and wherein the first language caption is displayed if the call is accepted and the first language caption is not displayed.

7. The method of claim 6, further comprising:

interrupting the audio output of the first video; and outputting the call via an audio output unit of the mobile terminal instead of the audio output of the first video.

8. The method of claim 1, wherein the method further comprises determining whether the application includes an audio output, and wherein the first language caption is displayed if the application includes the audio output and the first language caption is not displayed.

9. The method of claim 8, further comprising:

interrupting the audio output of the first video; and outputting audio included in the application via an audio output unit.

10. The method of claim 1, wherein the event comprises a change of a size of an image display region of the first video, and wherein the method further comprises:

determining a size of an empty space generated in response to the changed size; and changing a display size of the first language caption in response to the size of the generated empty space.

11. A mobile terminal, comprising:

a wireless communication unit configured to wirelessly communicate with at least one other terminal;

a display configured to display a first video; and a controller configured to:

receive an occurrence of an event on the mobile terminal; and selectively display a first language caption corresponding to the first video in response to the detected event, wherein the event comprises an activation of an application different than the first video being displayed, and wherein the controller is further configured to:

determine whether the application includes a video output;

maintain the displaying of the first video if the controller determines that the application does not include the video output, wherein a first control panel for controlling the first video is displayed with a second control panel for controlling the application, wherein the second control panel disappears after a prescribed period lapses such that the first video is able to be displayed fully, and wherein the controlling of the first video and the controlling of the application are performed simultaneously; and output an image of the application by interrupting the displaying of the first video if the application includes the video output, while displaying the first language caption on the image of the application and outputting an audio output of the first video.

12. The mobile terminal of claim 11, wherein the controller is further configured to:

measure via a microphone of the mobile terminal, a level of a surrounding noise surrounding the mobile terminal, and display the first language caption if the measured level of the surrounding noise is equal to or greater than a predetermined value.

13. The mobile terminal of claim 11, wherein the event excludes a command for displaying the first language caption.

14. The mobile terminal of claim 12, wherein the detected event is an input of a volume adjust command, wherein if the input of the volume adjust command is a volume-down command and the measured level of the noise is equal to or smaller than the predetermined value, the controller is further configured to display the first language caption, and wherein if the input of the volume adjust command is a volume-up command and the measured level of the noise is equal to or greater than the predetermined value, the controller is further configured to display the first language caption.

15. The mobile terminal of claim 11, wherein the event comprises a reception of an incoming call, and wherein the controller is further configured to display the first language caption if the call is accepted and the first language caption is not displayed.

16. The mobile terminal of claim 15, wherein the controller is further configured to:
   interrupt the audio output of the first video, and
   output the call via an audio output unit of the mobile terminal instead of the audio output of the first video.

17. The mobile terminal of claim 11,
   wherein the controller is further configured to:
      determine whether the application includes an audio output, and
      display the first language caption if the application includes the audio output and the first language caption is not displayed.

18. The mobile terminal of claim 17, wherein the controller is further configured to:
   interrupt the audio output of the first video, and
   output audio included in the second application via an audio output unit.

\* \* \* \* \*